C. W. LITTLEFIELD.
THERAPEUTIC LIGHT APPARATUS.
APPLICATION FILED FEB. 23, 1918.

1,277,089.

Patented Aug. 27, 1918.
3 SHEETS—SHEET 1.

Inventor
Charles W. Littlefield
By Henry L. Reynolds.
Attorney

C. W. LITTLEFIELD.
THERAPEUTIC LIGHT APPARATUS.
APPLICATION FILED FEB. 23, 1918.

1,277,089.

Patented Aug. 27, 1918.
3 SHEETS—SHEET 2.

Inventor
Charles W. Littlefield.
By Henry L. Reynolds.
Attorney

C. W. LITTLEFIELD.
THERAPEUTIC LIGHT APPARATUS.
APPLICATION FILED FEB. 23, 1918.

1,277,089.

Patented Aug. 27, 1918.
3 SHEETS—SHEET 3.

Inventor
Charles W. Littlefield.
By Henry L. Reynolds.
Attorney

UNITED STATES PATENT OFFICE.

CHARLES W. LITTLEFIELD, OF SEATTLE, WASHINGTON.

THERAPEUTIC LIGHT APPARATUS.

1,277,089.  Specification of Letters Patent.  Patented Aug. 27, 1918.

Application filed February 23, 1918. Serial No. 218,672.

*To all whom it may concern:*

Be it known that I, CHARLES W. LITTLEFIELD, a citizen of the United States, and resident of the city of Seattle, county of King, and State of Washington, have invented certain new and useful Improvements in Therapeutic Light Apparatus, of which the following is a specification.

My invention relates to an apparatus which may be employed to decompose light into its elementary colors and then to concentrate or collect a large number of similar rays upon the same area in such a manner that rays of the same color from all sources will be superposed upon the same area.

My invention is more particularly intended for purposes wherein the use of either the red, the infra-red, the violet, or ultra violet rays are desired, that is, the rays which come at and before the ends of the visible spectrum. The mechanism makes it possible to concentrate at will, either the infra-red, the ultra violet or other rays from a number of refractive media upon a common field or area.

One of the objects of my invention therefore is to provide a mechanism by which a considerable quantity of decomposed light may be applied in such a manner as to multiply any of the rays of the spectrum, and to apply selected portions of these rays for therapeutic, physical, chemical, and other uses.

The accompanying drawings show my invention embodied in the form of apparatus which at this time I believe to be the most practical and which I now prefer to use. I am, however, aware that the principles of my invention may be applied in apparatus which in many respects differs in superficial appearance in many ways from that herein shown, although the principles embodied may be the same.

Figs. 4 and 5 are diagrams illustrating two forms of patterns which may be formed by the rays in use, by proper adjustment of the mirrors, Fig. 4 showing the violet rays surrounding the center field while Fig. 5 shows the red rays in this position.

Figure 1:
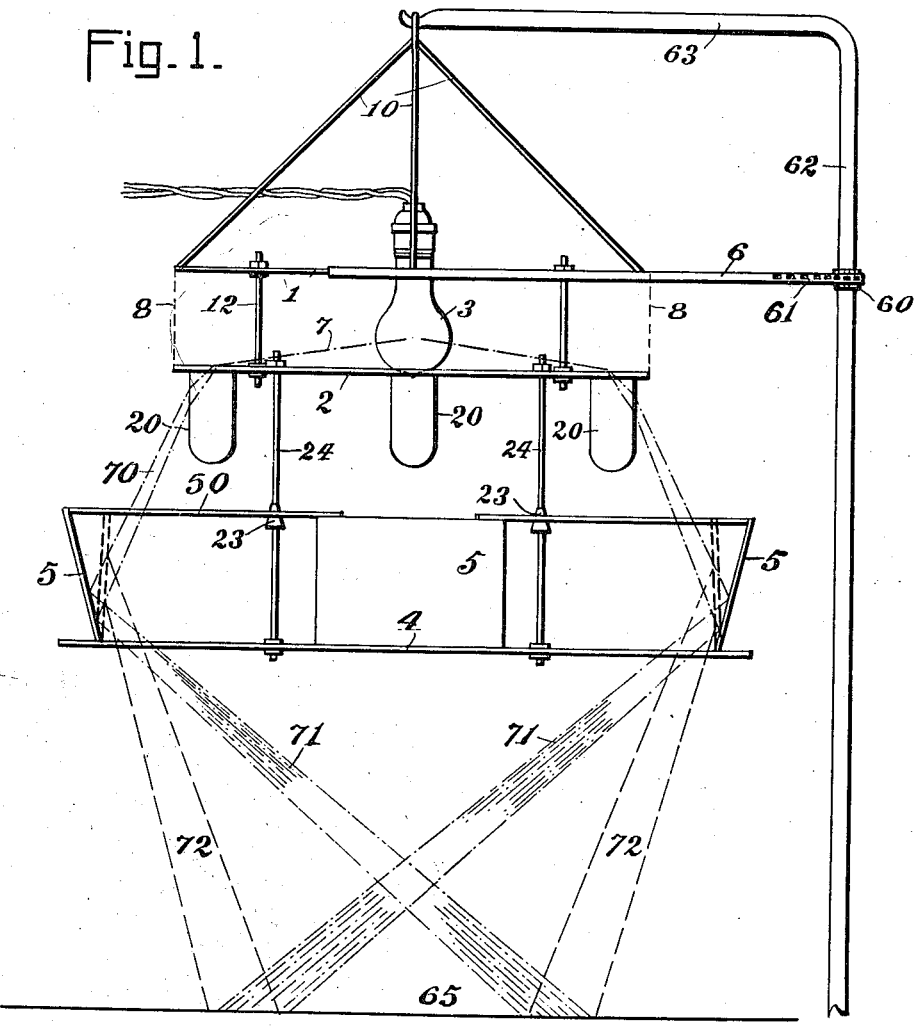
Figure 1 is a side elevation of this preferred embodiment of my apparatus.

The light 3 shown, which is an electric incandescent light, is the primary source of light. For convenience of control, this is placed between two plates, 1 and 2, these being provided with the necessary holes to accommodate the light bulb. To cut off the light which would shine out laterally between these plates, a curtain 8 may be used to inclose this space.

The two plates 1 and 2 are connected in any suitable manner, as by rods 12. The upper plate may be supported by rods 10 from an arm 63 extending from a port 62, or from any other supporting body. The manner of supporting the parts of this apparatus is an inmaterial one.

Figure 6:
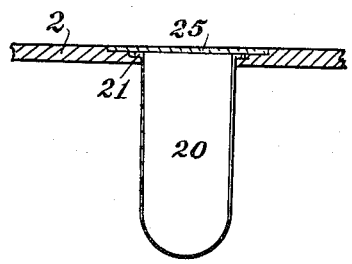
Fig. 6 is a sectional elevation taken through one of the spectrum forming tubes by which the light is decomposed.
Figure 2:
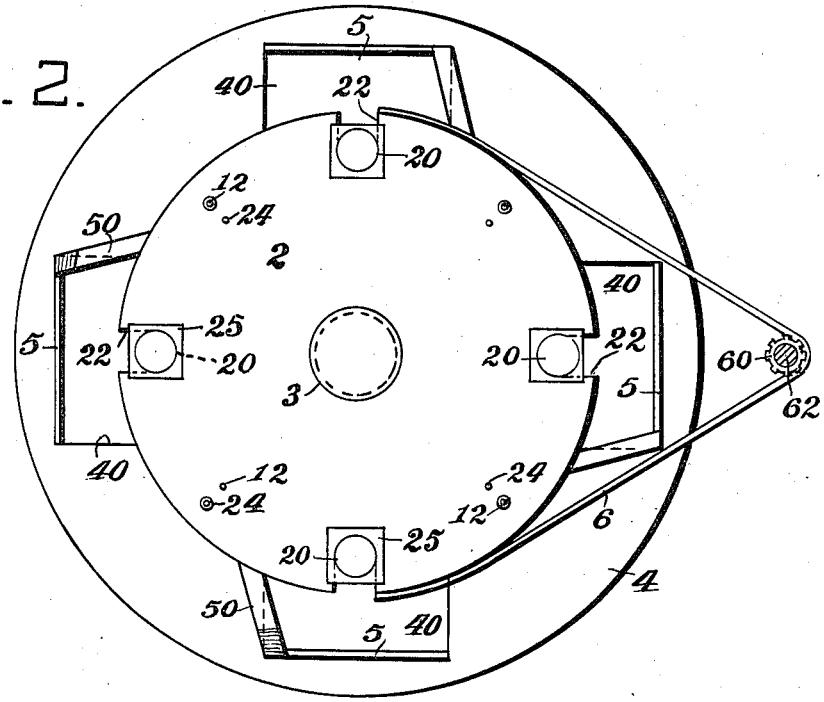
Fig. 2 is a plan view taken on the plane of the electric light.

The plate 2, has supported thereon, a number of light decomposing bodies or refraction media. Any accepted type of such devices may be employed. As shown in the drawings, these consist of short tubes 20, filled with water, or with such other liquid as is found to give the desired result. As shown in Fig. 6, the tube 20 has a slight flange 21, about its open end, which engages the edges of a notch 22 in the plate 2. These tubes are filled with water or any other suitable liquid, and the water preferably covered with a plate 25 of thin glass, which is in contact with the water, as this prevents quivering of the surface and evaporation.

I have shown only four of these tubes, or light decomposing members. Any number desired may be employed. The light striking the liquid surfaces at a low angle, is bent inwardly and also decomposed or separated into the primary colors of the spectrum. On passing out the outer vertical surface of the tube, the rays are further bent and the components thereof caused to diverge still more.

A plate 4 is suspended from the plate 2 by rods 24 and have thereon reflectors or mirrors, 5, so placed as to receive the rays emerging from the refraction media 20, reflecting these downward and toward the center. These mirrors are supported at their lower edges so that they may hinge or swing thereon, thus permitting adjustments which will control the position of the spectrum reflected upon the surface 65. This surface 65 is not necessarily a part of the apparatus, but represents the surface of any object to which the rays, as produced by the apparatus, are to be applied.

The plate 4 has holes 40, through which the rays reflected from the reflectors 5, may pass. The position of the reflectors may be adjusted and held by any suitable means. That shown consists of rods 50, which are flexibly connected with the upper edges of the reflectors and have slots 51 through which pass the rods 24. The rods 24 have cones 23 thereon which enter the slots 51 and bind sufficiently to hold the rods in place when adjusted. No particular form of hinge has been shown for the connections with the reflectors. This may be of flexible fabric, or of any other style.

Figure 5:
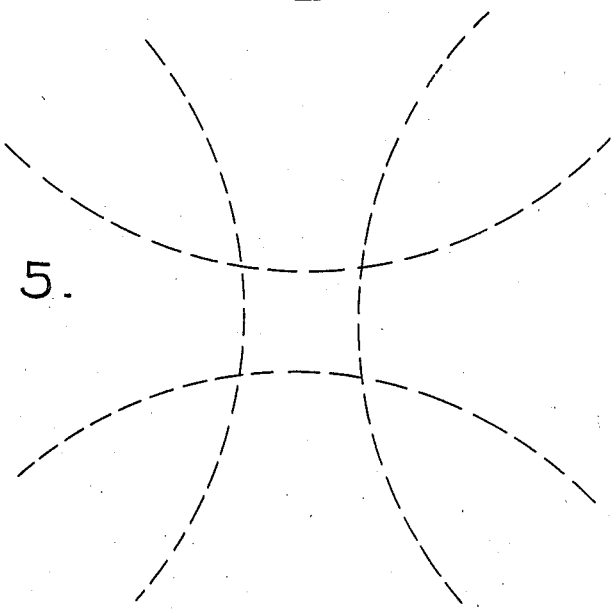
Figure 3:
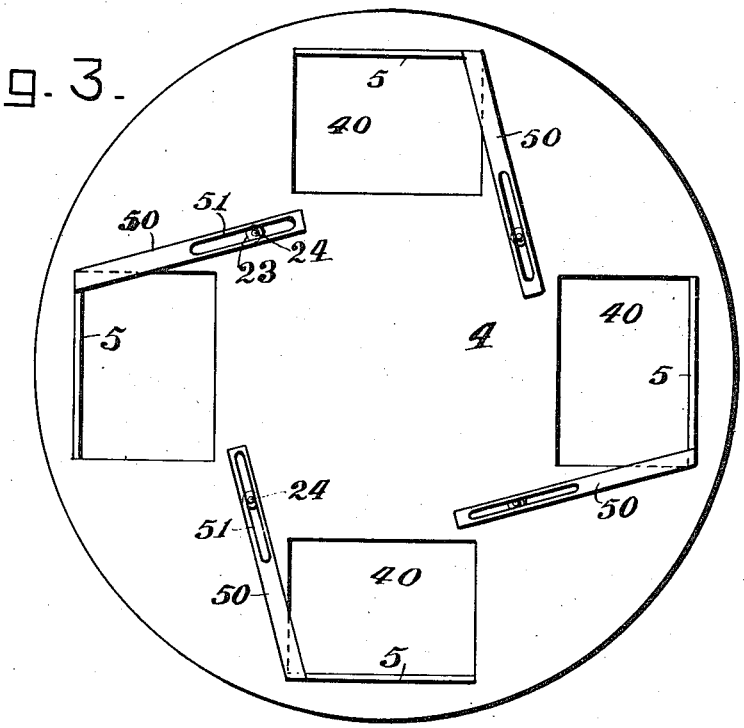
Fig. 3 is a plan view on the plane just above the reflectors.
Figure 4:
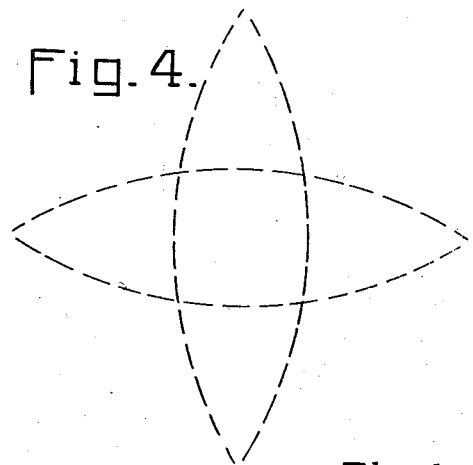

With the reflectors adjusted as shown in the full line positions in Fig. 1, a pattern such as shown in Fig. 4 is produced, in which the violet rays are toward the center of the figure and the red rays away from the center. When the reflectors are put in the dotted line position of Fig. 1, the pattern shown in Fig. 5 is formed, in which the red rays are toward the center and the violet rays away from the center.

It is possible to use this device to apply light from either the red or the violet ends of the spectrum to the desired object. It is also possible by an even adjustment of the reflectors, to produce symmetrical figures, such as those shown in Figs. 4 and 5, or by uneven adjustment to produce figures which are elongated in one direction.

In using this device for color therapy, which is one of the uses to which it may be put, it is possible to adjust the shape, within certain limit, to the shape of the surface to be treated. It is also possible to adjust so as to get the particular color of light desired.

To further assist in the adjustment in position of the figure I have shown a flexible band 6, having its ends secured to the edges of the disk 1 and passing about the standard 62, or some other fixed object, with which it may be engaged. By taking in one side of this and letting out the other, the whole apparatus may be adjusted somewhat in angular position. For convenience of adjustment and holding, a toothed band or pins, 60, may be secured to the post and the band 6 has a perforated section 61, for engagement therewith.

With a device of this kind colored rays of a pure quality may be produced and these rays from a number of sources combined at a desired point. By reason of its adjustability it is capable of use for a great variety of treatments.

What I claim as my invention is:

1. A device for decomposing light and pplying selected rays thereof, comprising a source of light, a plurality of light decomposing members grouped about said source of light, a reflector for each of said light decomposing members positioned to receive the decomposed rays, and means for adjusting the angular position of said reflectors to thereby concentrate selected rays of the decomposed rays upon a given area.

2. A device for decomposing light and applying selected rays thereof, comprising a central source of light, a plurality of transparent containers filled with liquid placed to receive the light upon their upper surfaces and to decompose the light passing therethrough, reflectors receiving said decomposed light and means for angularly adjusting said reflectors to concentrate selected rays from all said reflectors upon a given area.

3. A device for decomposing light and applying selected rays comprising a source of light, an opaque plate adjacent said light and having a series of holes arranged about said light, a transparent liquid container placed in each of said holes and receiving the light upon its surface at a low angle, a reflector for each of said liquid containers positioned to receive the decomposed rays issuing from its liquid container, and means for adjusting the angular position of said reflectors to control the application of the rays to a surface.

Signed at Seattle, Washington, this 15th day of February, 1918.

CHARLES W. LITTLEFIELD.